United States Patent Office 3,179,688
Patented Apr. 20, 1965

3,179,688
PHOSPHONYL- AND THIOPHOSPHONYL-THIO-NYLAMINES AND PROCESS OF PREPARING
Ludwig Maier, Zurich, Switzerland, assignor to Monsanto Company, a corporation of Delaware
No Drawing. Filed June 20, 1962, Ser. No. 203,697
4 Claims. (Cl. 260—461)

It has been found that a novel class of phosphorus compounds having the general formula

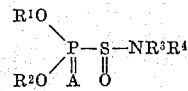

can be prepared by reaction of phosphites with amidothionyl halide.

In this formula $R^1$ and $R^2$ are identical or different, possibly substituted and/or unsaturated aliphatic, cycloaliphatic, araliphatic, aromatic or heterocyclic radicals which may be linked together, and $R^3$ and $R^4$ are identical or different hydrocarbon radicals which may be linked together. A is sulfur or oxygen. For insecticidal use preferred compounds are those in which $R^1$, $R^2$, $R^3$ and $R^4$ each have not more than 18 carbon atoms, more preferably not more than 8 carbon atoms, and especially alkyl radicals of not more than 8 carbon atoms.

The phosphites serving as first reactants of the general formula

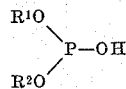

are well known from the literature. Examples are: dimethyl-, diethyl-, di-n-propyl-, di-iso-propyl, di-n-butyl, di-iso-butyl-, di-iso-amyl-, di-n-heptyl-, di-n-octyl-, di-2-octyl-, dibenzyl-, dicyclohexyl-, diphenyl-phosphite, etc. Examples of known phosphites with $R^1/R^2$ connected together are: ethylenephosphite, propylene-1,3-phosphite, propylene-1,2-phosphite, tetrahydrofurylene - 3,4 - phosphite, etc. Unsymmetrically substituted phosphites which contain a combination of the simple radicals enumerated above are as well suited as also diphosphites of which, for example $HOP(OCH_2CH_2O)_2POH$ is well known. Moreover, the phosphites may possess optional substituents, as long as these do not hinder the reaction of invention. As substituents qualify, for example, halogen, ether, ester, cyano, nitro groups, etc.

Thiophosphites or bis-thiophosphites of the formulae

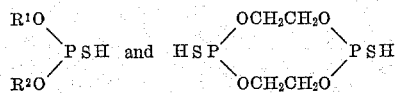

can also be used instead of the phosphites.

The second reactant which is necessary in the preparation of the novel phosphonyl-thionylamines or thiophosphonyl-thionylamines has the general formula $$R^3R^4N\text{---}SO\text{---}Hal$$

In this formula $R^3$ and $R^4$ have the significance as before and Hal signifies a halogen atom, preferably a chlorine atom. The preparation of such amidothionylhalides from, for example, dimethylamide, dimethyl dimethylamidosulfinate or dimethylamidosulfinic acid has been reported in the literature. Other amidothionylhalides fit for the preparation of the products of invention can be obtained from other secondary amines, such as diethylamine, di-n-propylamine, di-iso-propylamine, dibutylamine, N-methylbenzylamine, dibenzylamine, ethylaniline, diphenylamine, N-propyl-cyclohexylamine, dicyclohexylamine, pyrrolidine, piperidine, morpholine, etc., in like manner.

The reaction of dimethylamidosulfinic chloride with dialkylthiophosphites, i.e. the same reactants as used in the process of invention, has been described in the German patent application 1,046,034; however, since another processing method has been used therein, the resulting end-products are not thiophosphonyl-thionylamines, but thionophosphoric acid esters of the formula $$(RO)_2P(S)\text{---}SO\text{---}(S)P(OR)_2$$

The reaction leading to the phosphonyl- or thiophosphonyl-thionylamines of invention is based on the reaction of phosphites or thiophosphites with an amidothionyl halide in the presence of an acid-binding agent, such as triethylamine, cyclohexyldiethylamine, alpha-picoline, etc., and especially in the form of an alkali salt.

Conveniently, the acid halide is gradually added to a solution of the alkali phosphite or alkali thiophosphite in anhydrous benzene and heated, if necessary, for some time. The reaction occurs with, for example, sodium diethylphosphite and dimethylamidosulfinic acid chloride according to the following equation:

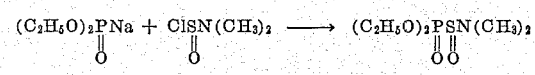

The phosphonyl- and thiophosphonyl-thionylamines which have not yet been known until now, are valuable pesticides, especially insecticides. They are also intermediates, since they can be oxidized in conventional manner to the corresponding phosphonyl- and thiophosphonyl-sulfonylamines.

EXAMPLE 1

*Preparation of*

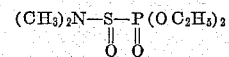

To 16.1 g. (0.1 mole) of sodium diethylphosphite in 50 ml. of benzene is slowly added a solution of 13 g. (0.1 mole) of dimethylamidosulfinic acid chloride in 20 ml. of benzene. The reaction is exothermic. The reaction mixture is subsequently refluxed for 2 hours and fractionally distilled.

Yield 9.6 g. (=42% of the theory); B.P. 59–63° C./0.05 mm.; $n_D^{20}$ 1.4273.

What is claimed is:
1. A process for preparing compounds of the formula

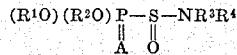

wherein $R^1$, $R^2$, $R^3$ and $R^4$ are alkyl having not more than 8 carbon atoms, A is selected from the class consisting of oxygen and sulfur, comprising reacting in the presence of an acid-binding agent a phosphite of the formula $$(R^1O)(R^2O)PAH$$

wherein $R^1$, $R^2$ and A are as defined hereinabove with an amidosulfinic halide of the formula $R^3R^4NSOX$ wherein $R^3$ and $R^4$ are as defined hereinabove, and X is a halogen atom.

2. A process of claim 1 wherein the phosphite is reacted in the form of an alkali metal salt in an inert solvent.

3. A process of claim 1 wherein X is the chlorine atom.
4. A process of preparing

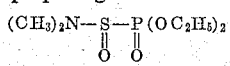

comprising reacting in an inert solvent sodium diethylphosphite with dimethylamidosulfinic acid chloride.

References Cited by the Examiner
UNITED STATES PATENTS

| | | | |
|---|---|---|---|
| 2,811,543 | 10/57 | Coover et al. | 260—461 |
| 2,891,059 | 6/59 | Malz et al. | 260—461 |
| 2,893,910 | 7/59 | Birum et al. | 260—461 |
| 3,044,981 | 7/62 | Malz et al. | 260—461 |

FOREIGN PATENTS

| | | |
|---|---|---|
| 1,058,050 | 5/59 | Germany. |
| 1,216,922 | 12/59 | France. |

CHARLES B. PARKER, *Primary Examiner.*

M. LIEBMAN, IRVING MARCUS, *Examiners.*